Oct. 12, 1943.    G. F. NADEAU ET AL    2,331,716
NONREFLECTING COATING
Filed Sept. 26, 1940
FIG.1.    FIG.2.    FIG.3.
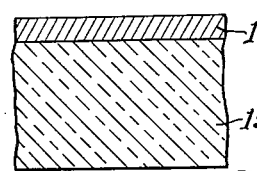 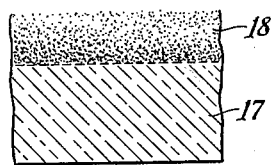 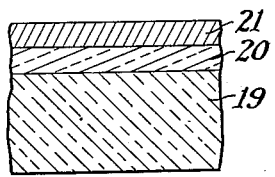
◄——— PRIOR ART ———►
FIG.4.    FIG.5.    FIG.6.
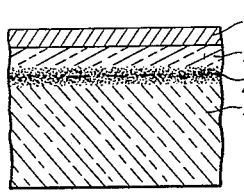 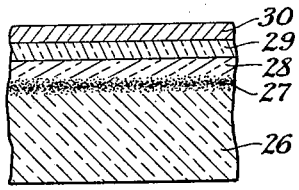 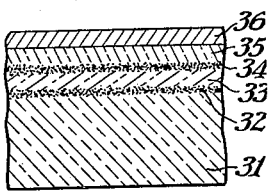
FIG.7.    FIG.8.    FIG.9.
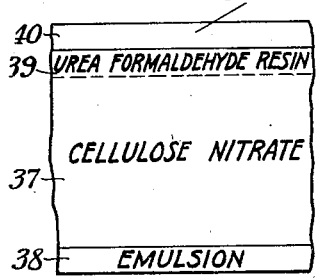 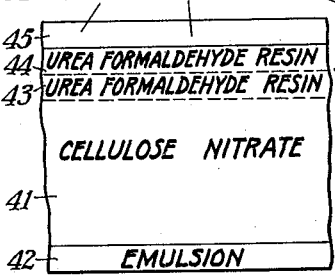 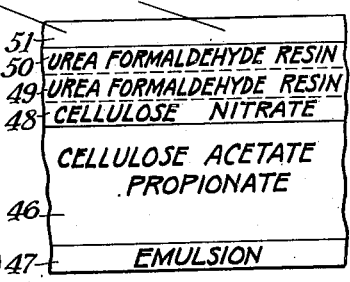
FIG.10.    FIG.11.
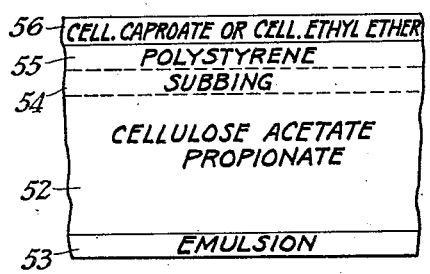 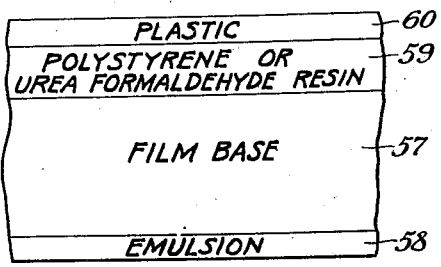
GALE F. NADEAU
EDWIN H. HILBORN
INVENTORS
BY *Newton M. Parvins*
ATTORNEY Patented Oct. 12, 1943

2,331,716

UNITED STATES PATENT OFFICE 2,331,716

NONREFLECTING COATING

Gale F. Nadeau and Edwin H. Hilborn, Rochester, N. Y., assignors to Eastman Kodak Company, Rochester, N. Y., a corporation of New Jersey Application September 26, 1940, Serial No. 358,512

9 Claims. (Cl. 95—9)

This invention relates to interference coatings for the reduction of Fresnel reflections.

It is an object of the invention to provide a coating for transparent media which will eliminate or at least reduce Fresnel reflections.

It is an object of the invention to provide such a coating which is relatively easy and inexpensive to manufacture.

It is an object of the one embodiment of the invention to provide an antihalation coating for photographic film. This antihalation layer is especially useful with films which are to be exposed through the base.

It is also an object of this embodiment of the invention to provide a coating which will adhere firmly to the film base.

In the history of non-reflecting coatings, two types have been proposed and in some cases there has been confusion as to which type certain coatings belong. One of these types does not necessarily involve the interference phenomenon and consists in eliminating any sharp interface between, for example, the air and the glass. That is, the surface of the glass was treated in an attempt to produce a layer in which the index of refraction changed gradually from that of air to that of the glass. Since it is practically impossible to get any solid or liquid with a refractive index approaching that of air, this type has proven to be completely impractical. It is now believed that any beneficial results obtained by effort in this direction were mainly due to interference phenomena which constitute the second type of non-reflecting coating. The gradual changeover layers would however, work theoretically.

The interference type of non-reflecting coating which is based on the same phenomenon as Newton's rings, was thoroughly investigated mathematically by Lord Rayleigh who published numerous papers on the subject including one "On the propagation of waves through a stratified medium," Proceedings of the Royal Society, 1912, page 207. He pointed out that a single film between two homogeneous media such as air and glass would have to be one-quarter of the wave length of light thick to obviate reflection. He also pointed out that several layers could be used and gave as an example a two layer film which would eliminate reflection although only one-sixth of the wave length of the light thick. In the Journal of the Optical Society of America, January 1936, Professor Strong described a practical application of Lord Rayleigh's arrangement using metallic fluoride on glass.

The limitations of the interference type of non-reflecting coating are due mainly to the materials available. As Strong points out, when only a single layer is used, the coating must have an index of refraction which is the square root of that of the glass. In the case of low index glass and other materials such as film base, it is not easy to find a material having a sufficiently low index of refraction. The use of a multi-layer film to overcome this limitation introduces further difficulties because of the accuracy with which the thickness of the various layers must be controlled.

The present invention is a combination of both of the systems and succeeds in using only a practical form of each of them. According to the invention, an article of low Fresnel reflectivity is made up of a transparent material such as glass or film base having a relatively low refractive index and the surface of this material is coated with a material of relatively high refractive index, the coating being so applied that it is diffused into the glass or the film so that no sharp interface exists. The reflection from the upper surface of the coating is then removed by an interference overcoating. The overcoating may be either of the single or multi-layer type, but for practical reasons is preferably only a single layer whose thickness is one-quarter of the wave length of light, the reflection of which is to be reduced. The coating which is diffused into the base may include any number of diffused changeovers, but if the material to be used is compatible with the base, the simplest method is to apply it directly with or without special preparation of the glass or film surface. It will be noted that this arrangement overcomes the objections to each of the prior types of non-reflecting coatings. The gradual changeover layer has an index which changes from that of the glass or film up to that of the coating and it nowhere involves an index which is not realizable practically. The coating has a high index of refraction, and hence, the problem of finding suitable interference over-coatings is greatly simplified.

We are not going into the mathematics of the diffuse changeover layers employed in this invention. It is sufficient to point out that the changeover region should be at least a quarter wave length thick and if it is many times this thickness, little or no attention need be paid to the rate at which the index changes from that of the glass to that of the coating. For complete elimination of reflection with a diffused changeover layer only one-quarter wave length thick, the change in index of refraction in this layer should follow a geometric progression curve, but we have found both in practice and theory that thicker changeover layers can follow almost any curve. The thickness of the coating itself between the outside surface thereof and the start of the changeover region may have any thickness, even zero. The fact that these two thicknesses do not have to be accurately controlled is of the greatest practical significance. When the overcoating consists of one layer only, this means that only the one layer has to be accurately controlled as to thickness, and even when a multi-layer interference overcoating is used, the present invention results in reducing the number of layers whose thickness has to be accurately controlled and in giving a high index front surface to the article.

In the embodiment of this invention wherein it is applied to film base as an anti-halation coating, a plastic of high refractive index is coated on the film base and by the use of suitable solvents is diffused into the film base so that no sharp interface occurs. If necessary an intermediate layer compatible with both the film base and the high refractive plastic may be first coated on the film. If this subbing has the same index of refraction as the film, the interface therebetween need not be diffused. On the other hand, if it has the same index as the coating, the interface between it and the coating need not be diffused. If it has an index intermediate between the two, both interfaces should be diffused according to the invention. A plastic overcoating is then applied on top of the high index coating and the thicknesses are controlled so that the surface reflection is reduced by interference.

As a high refractive coating we have found that high refractive urea formaldehyde resin and/or polystyrene are most satisfactory and may be overcoated with any low index plastic such as ethyl cellulose or cellulose caproate. Thus, the invention involves as a sub combination an interference coating of low index plastic between air and polystyrene or high refractive urea formaldehyde resin in simple or modified form. This sub combination is useful whether the other features of the invention are present or not.

Other objects and advantages of the invention and the invention itself will be understood from the following description when read in connection with the accompanying drawing in which:

Fig. 1 is a cross section of an article of low reflectivity having an interference coating according to the prior art.

Fig. 2 similarly illustrates another type of prior art coating.

Fig. 3 illustrates a multi-layer coating according to the prior art.

Figs. 4, 5 and 6 similarly illustrate various embodiments of the present invention.

Figs. 7, 8, 9 and 10 illustrate how the invention may be applied to film base.

Fig. 11 illustrates a sub combination present in the embodiment of the invention applied to film base.

In Fig. 1 a transparent medium 15 such as glass or film is provided with a surface coating 16 whose thickness is one-quarter of the wave length of light or an odd multiple of this value. The index of refraction of layer 16 should be as near as possible to the square root of the index of the medium 15, but considerable reduction of reflection is obtained even when the index of the layer 16 is only relatively slightly lower than that of the layer 15. In Fig. 2, the transparent medium 17 is provided with a coating 18 whose index of refraction changes gradually from that of the medium 17 to that of the surrounding air. Such systems are not realizable practically although they have been discussed in the prior art as of theoretical interest. In Fig. 3 is shown a transparent medium 19 having a two layer overcoating including layers 20 and 21 whose thicknesses and indicies of refraction are so arranged that the total resultant reflection due to interference of the partial reflections from the three interfaces (the "air to 21" interface, the "21 to 20" interface and the "20 to 19" interface) is a minimum.

According to the invention as shown in Fig. 4, a transparent medium 22 of relatively low refractive index is provided with a coating 24 of relatively high refractive index, which coating is diffused into the medium 22 gradually throughout a changeover region 23. The changeover region 23 must have a thickness greater than a quarter wave length of the light and preferably many times this value. The actual thickness of the coating 24 is not critical in any way. In the preferred embodiment shown in this Fig. 4, the upper surface of the coating 24 has its reflection eliminated or at least reduced by a single layer interference coating 25 whose index of refraction is relatively low compared to that of the coating 24 and whose thickness is approximately one-quarter of the wave length of light. It is realized that interference coatings cannot be produced which will correct fully for more than one wave length in the visible spectrum, but it is well known that results which are of great practical importance are obtained if coatings which give a minimum reflection in the green part of the spectrum are used. The red and blue reflections in this case are only partially reduced but the results obtained are still quite useful. In this specification we refer to thicknesses being one-quarter of the wave length of light meaning that light for which it is most desirable to reduce the reflection to a minimum, e. g. green light, or perhaps red light.

Fig. 5 illustrates a slightly different embodiment of the invention wherein the transparent medium 26 is provided with a high index coating 28 with a diffused changeover region 27 between them. In this case the interference overcoating consists of two layers 29 and 30 arranged to operate in the same manner as the multi-layer coating of Fig. 3. In Fig. 6 is shown an arrangement wherein a high index coating 35 is used which cannot easily be applied directly to the transparent medium 31 and for this reason an intermediate coating or subbing 33 is used. In the arrangement shown, the interfaces 32 and 34 bounding the subbing 35 are both diffused, but if the subbing 33 has the same index of refraction as the medium 31, the interface 32 need not be diffused and similarly if the subbing 33 has substantially the same index as the coating 35 the interface 34 need not be diffused. As before, the front surface reflection of the coating 35 is reduced by an interference overcoating 36.

An application of this invention to film base is shown in Fig. 7 wherein a cellulose nitrate film 37 having an emulsion coating 38 on one side thereof is provided on the other side with a high index coating 39 of urea formaldehyde resin and an interference overcoating 40 of cellulose caproate or cellulose ethyl ether. The interface between the urea formaldehyde resin 39 and the cellulose nitrate is diffused. One method of doing this is shown in Fig. 8 wherein the cellulose nitrate base 41 provided with an emulsion layer 42 is first coated with a urea formaldehyde resin layer 43 applied with an active solvent such as 20% acetone and 60% methanol; the other 20% may be an inactive solvent such as a chlorinated hydrocarbon. Over this is applied another coating of urea formaldehyde resin from any inactive solvent such as a chlorinated hydrocarbon. The active solvent causes the urea formaldehyde resin to diffuse into the cellulose nitrate eliminating any sharp interface between the layer 43 and the base 41. Since the layer 44 consists of the same material, i. e., has the same index of refraction as the layer 43, any sharp interface between these two layers would be of no optical significance, but of course any solvent used for urea formaldehyde resin in layer 44 would be active for the same material in layer 43. The cellulose-nitrate has a refractive index of about 1.5, hence, it is not easy to find a material which could be applied as a single interference layer directly on cellulose nitrate. By means of the invention, the index of refraction at the surface is stepped up without any sharp interface to that of a high refractive urea formaldehyde resin, namely, about 1.66. Various high refractive urea formaldehyde resins including modified urea formaldehyde resins are well known and are available commercially. We are not aware of any low refractive ones, but in case such exist we distinguish those useful in this invention by referring to them as high refractive urea formaldehyde resins.

An overcoating 45 of cellulose caproate coated from ligroin or of ethyl cellulose coated from butanol is superimposed on the urea formaldehyde resin to have a thickness approximately one-quarter of the wave length of the light. The index of refraction of the cellulose caproate in thick layers is about 1.48 and that of ethyl cellulose is about 1.47. It is quite possible that these materials have even a lower index when coated in thin layers. From a practical point of view, we have found that the reflection with this arrangement is greatly reduced compared to that of cellulose nitrate alone.

Practically, the urea formaldehyde resin is so applied to the cellulose nitrate that the surface reflection is a maximum. Theoretically, the best way of doing this would be to make the interface between the cellulose nitrate and the urea formaldehyde resin sharp and to have the urea formaldehyde resin one-half of the wave length of the light thick. The reflection due to the resulting additive interference could then be reduced by the layer 45. However, the practical difficulties involved in controlling the thickness of the layer 44 make it undesirable to attempt to coat both the urea formaldehyde resin and the overcoating 45 to accurate thicknesses. Thus, more uniform results are obtained by diffusing the urea formaldehyde resin into the cellulose nitrate and relying entirely on the control of thickness of the overcoating 45 for the reduction of reflection.

Whether a solvent is active or not depends on the surface being coated. For cellulose nitrate, acetone or alcohol is active and all chlorinated hydrocarbons including carbon tetrachloride, ethylene dichloride, etc., are inactive; the same general rule holds for cellulose acetate propionate but ethylene dichloride is active in this latter case.

In Fig. 9 a cellulose acetate propionate base 46 provided with an emulsion layer 47 is first coated with a subbing 48 of cellulose nitrate which is compatible both with the cellulose acetate propionate 46 and the urea formaldehyde resin deposited in two layers 49 and 50. Since the cellulose nitrate has substantially the same index of refraction as the cellulose acetate propionate, no effort is made to diffuse the interface between these two layers. The front surface reflection of the urea formaldehyde resin 50 is reduced by a suitable interference layer 51.

An alternative arrangement is shown in Fig. 10, in which the cellulose acetate base 52 provided with an emulsion layer 53 is first coated with a subbing 54 such as the resin made by treating an alkyl substituted paratoluene sulfonamide with formaldehyde. See U. S. Patents 2,133,110 2,096,675, 2,096,616, and particularly 2,096,617. A high index layer 55 of plastic, specifically polystyrene, is then coated on the subbing 54 with a diffused interface. An interference layer 56 of cellulose caproate or cellulose ethyl ether is overcoated on the polystyrene.

In Fig. 11 is illustrated a subcombination which is present in the invention but which is also separately useful. A film base 57 of cellulose ester is provided with the usual emulsion layer 58 and a multi-layer non-reflecting coating on the rear surface thereof. This multilayer coating consists of a polystyrene or high refractive urea formaldehyde resin layer 59 and an overcoating 60 of a plastic whose index of refraction is low, i. e., about 1.5. Such an arrangement gives very satisfactory results whether care is exercised to diffuse the polystyrene or the urea formaldehyde resin into the cellulose ester or to control this layer 59 in some other way (such as by making it a half wave length thick) to give a maximum reflection from the front surface (i. e. the interface between 59 and 60) thereof.

Having thus described the preferred embodiments of our invention, we wish to point out that it is not limited to these specific arrangements but is of the scope of the appended claims.

What we claim and desire to secure by Letters Patent of the United States is:

1. An article of low reflectivity for light of a given wave length comprising a transparent material of relatively low refractive index, a coating whose refractive index is higher than that of the material diffused into the surface of the material so that no sharp interface exists, the changeover region of diffusion being greater than one-quarter of said wave length in thickness and a destructively interfering overcoating to reduce reflection by optical interference, on, and forming a sharp interface with, the coating.

2. An article of low reflectivity for light of a given wave length comprising a transparent material of relatively low refractive index, a coating whose refractive index is higher than that of the material diffused into the surface of the material so that no sharp interface exists, the changeover region of diffusion being greater than one-quarter of said wave length in thickness and an overcoating consisting of a single layer whose index of refraction is low compared to the coating and whose thickness is substantially one-fourth of said wave length.

3. An article of low reflectivity for light of a given wave length comprising a cellulose ester film, a plastic coating whose refractive index is higher than that of the film diffused into the one surface of the film so that no sharp interface exists, the changeover region of diffusion being greater than one-quarter of said wave length in thickness and a plastic destructively interfering overcoating to reduce reflection by optical interference, on, and forming a sharp interface with, the coating.

4. An antihalation film with low halation for light of a given wave length comprising a cellulose ester film base, a photosensitive emulsion on one surface thereof, a plastic coating whose refractive index is higher than that of the base diffused into the other surface of the film base so that no sharp interface exists, the changeover region of diffusion being greater than one-quarter of said wave length in thickness and a destructively interfering overcoating to reduce reflection by optical interference, on, and forming a sharp interface with, the coating.

5. An antihalation film comprising a cellulose ester film base, a photosensitive emulsion on one surface thereof, a plastic coating whose refractive index is higher than that of the base diffused into the other surface of the film so that no sharp interface exists and a plastic overcoating forming a sharp interface with the coating and consisting of a single layer whose index of refraction is low compared to that of the coating and whose thickness is substantially one-fourth of the wave-length of green light.

6. An antihalation film with low halation for light of a given wave length comprising a cellulose ester film base, a plastic coating from the group consisting of polystyrene and high refractive urea formaldehyde resin diffused into the surface of the film base so that no sharp interface exists, the changeover region of diffusion being greater than one-quarter of said wave length in thickness and a destructively interfering overcoating of a plastic material to reduce reflection by optical interference, on, and forming a sharp interface with, the coating.

7. An antihalation coating for cellulose ester film base comprising a plastic layer from the group consisting of polystyrene and high refractive urea formaldehyde resin on the surface of the film base, said layer giving to the base a surface reflectivity greater than that of the base alone and a destructively interfering overcoating of a cellulose derivative to reduce reflection by optical interference, on, and forming a sharp interface with, the plastic layer.

8. An antihalation film comprising a cellulose ester film base, a plastic coating from the group consisting of polystyrene and high refractive urea formaldehyde resin diffused into the surface of the film base so that no sharp interface exists and a plastic overcoating consisting of a single layer whose index of refraction is low compared to that of the coating and whose thickness is substantially one-fourth of the wave length of green light.

9. An uantihalation coating for celllose ester film base comprising a plastic layer from the group consisting of polystyrene and high refractive urea formaldehyde resin on the surface of the film base, said layer giving to the base a surface reflectivity greater than that of the base alone and an overcoating forming a sharp interface with the plastic layer and consisting of a single layer of a cellulose derivative whose index of refraction is low compared to the plastic layer and whose thickness is substantially one-fourth of the wave length of green light.

GALE F. NADEAU.
EDWIN H. HILBORN.